(Model.)
R. B. REILAY.
Fruit Jar.
No. 229,638.          Patented July 6, 1880.
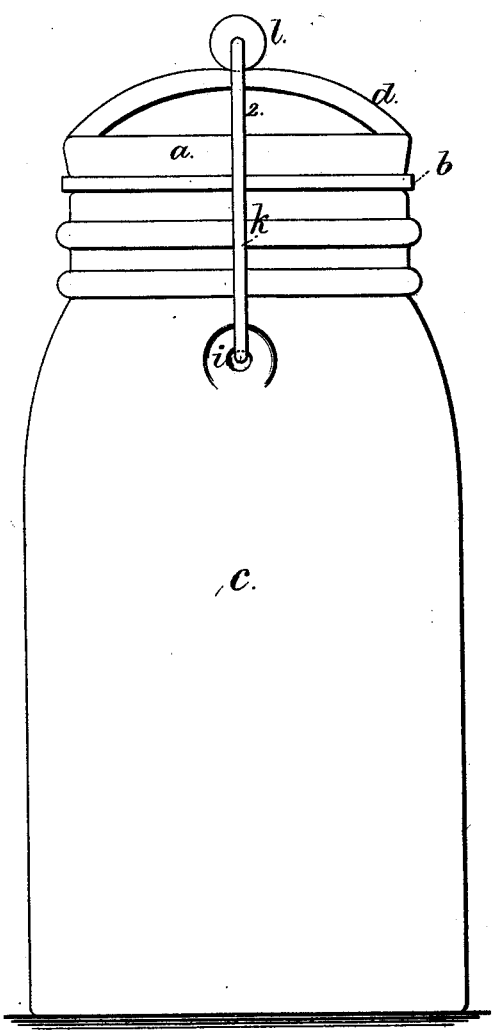
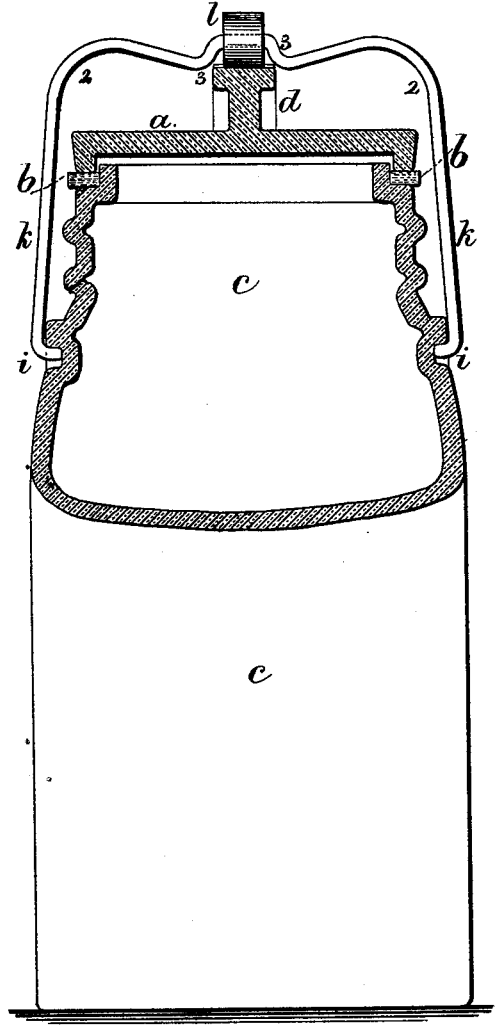
Witnesses
Chas. H. Smith
Geo. T. Pinckney
Inventor
Richard B. Reilay.
per Lemuel W. Serrell
atty
N. PETERS, PHOTO-LITHOGRAPHER, WASHINGTON, D. C.

UNITED STATES PATENT OFFICE.

RICHARD B. REILAY, OF WILKESBARRE, PENNSYLVANIA, ASSIGNOR TO DOUGLAS F. MALTBY, OF WATERBURY, CONNECTICUT.

FRUIT-JAR.

SPECIFICATION forming part of Letters Patent No. 229,638, dated July 6, 1880.

Application filed March 1, 1880. (Model.)

*To all whom it may concern:*

Be it known that I, RICHARD B. REILAY, of Wilkesbarre, in the county of Luzerne and State of Pennsylvania, have invented an Improvement in Fruit-Jars, of which the following is a specification.

Before my invention the covers or stoppers of fruit-jars had been made with an arch across the top, upon which the center part of a wire bail rested, to act as a spring in pressing the jar-cover to its place. A bottle-stopper had also been made in which the upper surface is convex or conoidal, with a recess in the middle, and a roller upon the bail rests in such recess when the stopper is closed.

My invention relates to a wire bail with a roller, the wire being bent so as to retain the roller in its central position, and to form bows extending away from the pivots to increase the leverage in moving the bail, in combination with a cover having an arch across it, the surface of which is two arcs of circles of shorter radius than the bail, so that the movement of the bail across the arch causes the roller to press the arch and cover and cause the latter to tightly close the bottle or fruit-jar, and the roller remains in the slight depression formed by the surfaces of the two arcs where they meet.

In the drawings, Figure 1 is a side view of the stopper and jar, and Fig. 2 is an elevation of the bail and roller with the glass cover and part of the jar in section.

The cover *a* rests upon an elastic washer, *b*, at the top or mouth of the jar or bottle *c*. Upon the cover *a* there is an arch, *d*, running across the same. This arch is made with a central body and flanged top. The surface of the arch is composed of two arcs of circles the centers of which are above the pivots *i* of the bail and at a short distance apart; hence as the roller *l* upon the bail *k* is rolled upon the arch it will press the same downwardly by rolling over a surface that increases in its distance from the pivot of the bail, and when the roller reaches the middle portion of the arch it is not liable to roll off the same, because the junction of the curves is slightly the lowest. Hence the forces will act to keep the roller in the center of the arch, and there will be nothing to produce a sudden concussion on the glass as the roller is rolled up to place.

The pivots *i* of the bail *k* are preferably formed of recesses in the glass, into which the L-shaped ends of the wire pass, as shown in Fig. 2, and the wire bail is bent into the spring-bows 2 2, to facilitate pressure, by the thumbs in opening and closing the stopper, and the wire is bent downwardly at 3 3, so as to hold the roller in position endwise.

I claim as my invention—

The wire bail with a roller, the wire being bent so as to retain the roller in its central position, and to form bows extending away from the pivots to increase the leverage in moving the bail, in combination with a cover having an arch across it, the surface of which is two arcs of circles of shorter radius than the bail, as and for the purposes set forth.

Signed by me this 27th day of February, A. D. 1880.

RICHARD B. REILAY.

Witnesses:
GEO. T. PINCKNEY,
WILLIAM G. MOTT.